United States Patent [19]

Emblem et al.

[11] 4,166,753

[45] Sep. 4, 1979

[54] BINDING OF REFRACTORY MATERIALS

[75] Inventors: Harold G. Emblem; Anup K. Das, both of Bromley, England

[73] Assignee: Zirconal Processes Limited, Bromley, England

[21] Appl. No.: 857,761

[22] Filed: Dec. 5, 1977

[51] Int. Cl.$^2$ ............................................. C04B 31/40
[52] U.S. Cl. ................................. 106/308 Q; 106/69
[58] Field of Search ............................. 106/69, 308 Q

[56] References Cited

U.S. PATENT DOCUMENTS

| | | | |
|---|---|---|---|
| 2,736,669 | 2/1956 | Goebel | 106/308 Q |
| 2,944,914 | 7/1960 | Bugosh | 106/308 Q |
| 3,547,832 | 12/1970 | Hass et al. | 106/69 |
| 3,720,532 | 3/1973 | Simpson et al. | 106/308 Q |
| 4,068,024 | 1/1978 | Laufer | 106/308 Q |

Primary Examiner—James Poer
Attorney, Agent, or Firm—Christensen, O'Connor, Johnson & Kindness

[57] ABSTRACT

The invention provides a method of producing a usefully gellable cohydrolysate from a normally gellable substance and a substance not normally gellable. The latter substance has an alkoxy group implanted on it and preferably is a hydrous oxide which offers appropriate bridge groups for this implant.

23 Claims, No Drawings

BINDING OF REFRACTORY MATERIALS

This application corresponds to Great Britain applications 51751/76, filed Dec. 10, 1976, and 6986/77 filed Feb. 18, 1977, the priority of the filing dates of which is hereby claimed under 35 U.S.C. 119.

This invention relates to the formation of a usefully gellable material and the use of this material, for example for binding refractory powders.

The invention is particularly concerned with procedures wherein an ester is hydrolysed or when an organic silicate is hydrolysed to produce a hydrolysate which sets, i.e. gells, usually with the assistance of a catalyst, to provide a rigid coherent gell. The gell after firing leaves a refractory residue. One such procedure involves the hydrolysis of an alkyl silicate using an acid or alkaline catalyst.

The present invention in broad aspect, contemplates implanting alkoxy groups on a substance which after firing leaves a refractory residue but is not normally capable of being hydrolysed to provide a usefully gellable hydrolysate. This implanting of alkoxy groups will hereinafter be referred to as etherification. The substance thereby rendered hydrolysable is then jointly hydrolysed with, or added to the hydrolysate of, an organic silicate to provide a usefully gellable cohydrolysate.

The said substance is preferably a hydrous inorganic usually metal oxide offering hydroxyl, oxide or oxo bridge groups. Suitable metals are silicon, titanium, tin, zirconium, aluminium, zinc and chromium.

The oxide particles should be finely divided and for optimum etherification the particle size should be of the order of 1 $\mu$. Thus the hydrous oxide may conveniently be a hydrous metal oxide gell. One specifically preferred gel is sold under the Registered Trade Mark GASIL and is prepared by treating sodium silicate with acid to form the hydrous silica precipitate. The precipitate is washed to free it from sodium sulphate and then ground to an average particle size of less than 10 $\mu$. The hydroxyl oxide or oxo bridge groups can be etherified by causing the hydrous metal oxide to react with a water soluble or water miscible alcohol, alone or with an organic solvent such as acetone, cyclohexanone, toluene or xylene. Although the etherification does not take place slowly at room temperature it is preferably induced by warming the reaction constituents or by subjecting the constituents to physical work for example by applying shearing forces or by a combination of these expedients. Preferred alcohols are methanol, ethanol, n-propanol and iso-propanol. The reaction with hydrous silica and ethanol may be represented as:

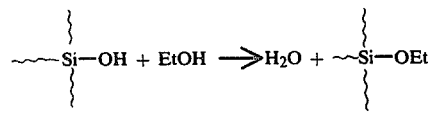

Hydrous zirconium oxide contains both hydroxyl and oxo groups. The reaction with ethanol may be represented as:

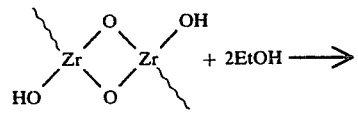

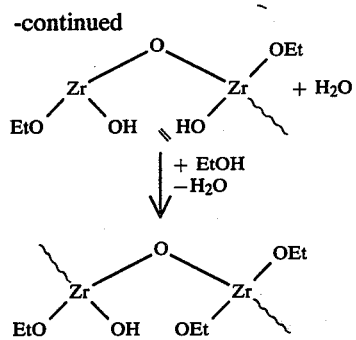

The etherification is the implanting of the OEt group(s) on the hydrous silica or the hydrous zirconium oxide. When the etherification reaction is induced by heat the reaction is preferably carried out at the boiling point of the alcohol at atmospheric pressure. A minimum reaction time of 10 minutes, in the case of ethanol and hydrous silica gel, is suitable. Lower temperatures can be used, but the reaction time for etherification is now much longer. When the reaction is induced by physical work a reaction time of 10 minutes can be achieved by high speed stirring at approximately 3,000 r.p.m.

The organic silicate used is preferably a $C_1$–$C_6$ alkyl silicate. Ethyl silicate is the most preferred organic silicate. Either ethyl orthosilicate (tetraethoxysilane) or technical ethyl silicate (which is a mixture of ethyl orthosilicate and ethyl polysilicates) may be used. The hydrolysis is preferably carried out under acid or alkaline conditions. When alkaline conditions are used, hydrolysis and gelation occur at the same time.

Up to 75% of the silica in the organic silicate may be replaced by the hydrous metal oxide. In the case of the oxide being a silica gel an effective gellable hydrolysate is formed wherein 50% of the $SiO_2$ in the hydrolysate is derived from the silica gell. The joint hydrolysate thus formed has similar gelling time and strength characteristics to a hydrolysate produced from an alkyl silicate alone.

Another suitable hydrous metal oxide for carrying out the method of the invention is a reactive alumina gell. One suitable gell is sold by Alcoa of Great Britain Limited under the name of Reactive Alumina A-15 Superground. Another suitable hydrous metal oxide is the hydrous silica obtained by the flame hydrolysis of silicon or other metal halide. Although not a gel this substance has a particle size of about 1 $\mu$. One such substance is sold under the Regisgtered Trade Mark AEROSIL. Flame hydrolysis is the burning of the halide in hydrogen thereby liberating steam for hydrolysis.

The mean size of the particles in the hydrous metal oxide gel is, as mentioned above significant. In the case of a silica gel we have found it advantageous to use a particle size of less than 1 $\mu$ preferably less than 0.7 $\mu$. Commercial available gells have a larger particle size than this, thus two useful gels GASIL 35 and GASIL 200 have particle sizes of 3 $\mu$ and 5 $\mu$ respectively. Thus a reduction of mean particle size for optimum results is preferable. This can be achieved by depolymerisation of the Si—O—Si linkages by chemical attack with a strong mineral acid such as $H_2SO_4$ or $HNO_3$, by wetting in the presence of an organic solvent and surfactant under the influence of heat, by breaking down of the silica particles by the shearing action of mechanical agitatators or by a combination of mechanical agitation and the action of a surface active agent based on the "steric stabilisation" principle. For the theory of "steric stabilisation" reference is made to an article by D. H. Napper in Journal 1 Industrial & Engineering Chemistry. Product Research and Development 1970 Volume 9 page 467. The reduction in particle size using a mechanical agitator, such as a sand or perl mill, is preferred as the work performed by such an agitator induces the reaction between the silica gell and the alcohol. A gel having a particle size above the optimum from the reaction point of view can thus be used as a starting material, reduction in particle size is achieved as the reaction progresses.

The implanting of the alkoxy groups must take place before the joint hydrolysis. This may be achieved by reacting the hydrous metal oxide with an alcohol as a separate operation and thereafter as a further operation, adding the organic silicate and forming the joint hydrolysate. However all the ingredients of the system i.e. the metal oxide, the alcohol, the water for the hydrolysis and the organic silicate may be mixed together and the reactions allowed to proceed in the same system. To achieve this however the presence of a mutual solvent for water and the alcohol, such as a polyethylene glycol is required.

The joint hydrolysate in accordance with the invention is particularly useful for binding refractory powders, the powder and the liquid hydrolysate being mixed into a slurry and caused to set the desired shape by pouring into a mould or over a pattern.

The refractory powder may be acidic neutral or basic in character. Acidic or neutral materials are preferred. Examples of suitable powdered refractory material include alumina (fused, calcined or tabular), mullite, sillimanite and other aluminosilicates, zircon and zirconia, the spinels, also magnesium oxide materials.

Other examples of suitable powdered refractory materials are given in British patent specification Nos. 1,429,723 and 1,451,548. Other examples of suitable powdered refractory materials are silicon carbide, silica.

When the hydrolysis reaction is carried out under acid conditions, a slurry is formed from the hydrolysate and the powdered refractory material. This slurry may be set by adding an alkaline reagent, such as an ammonia solution, a strong solution of ammonia acetate (British Pharmacopeia 1953 edition,) or a solution of ammonia carbonate, or an organic base such as piperidine. Alternatively, the alkaline reagent may be magnesia, conveniently the magnesia suspension described in British patent specification No. 1,356,247. The alkyl silicate may also first be hydrolysed separately under acid conditions and the etherified hydrous metal oxide added to the alkyl silicate acid hydrolysate, or vice versa. Then a slurry is formed by adding the powdered refractory material and set by an alkaline reagent. If desired, the alkyl silicate may also be hydrolysed under neutral conditions, as described in British patent specification No. 1,459,786 or by using a tin (IV) organic compound as hydrolysis catalyst, as described in British patent specification No. 1,494,209 and in our copending Patent Application No. 19589/77.

When the hydrolysis reaction is carried out under alkaline conditions the etherified hydrous oxide and the organic silicate are mixed, then the alkali and water are added. The alkali is one or more of the organic bases described in British patent specification Nos. 575,734 and 612,622 also in U.S. Pat. Nos. 2,550,923 and 2,660,538. When the alkali and water have been added, the refractory powder is now added, to give a slurry which is allowed to set to a rigid coherent shape.

The invention gives a method for the preparation of shaped refractory objects. The slurry of hydrolysate and refractory powder is poured into a suitable mould and allowed to set. When the slurry has set, the resulting 'green' shape is removed from the mould, then air-dried and fired following known procedures to give a shaped refractory object. Moulds, part moulds or cores for use in casting metals or alloys may also be prepared in this way. When an acid hydrolysis procedure is used for the hydrolysis of the organic silicate, moulds, part moulds or cores for use in casting metals or alloys may also be prepared using the procedures described in British patent specification Nos. 761,394 and 774,184, also in Eire Pat. No. 27,266. When an acid hydrolysis procedure is used for the hydrolysis of the organic silicate, monolithic ceramic shell moulds may be prepared by dipping a wax or other expendable pattern into the slurry of hydrolysate and refractory powder and causing the coating on the pattern to set by treatment with ammonia vapour, or by air drying. Examples of suitable refractory materials are silica, alumina and zircon, all passing 200 mesh B.S. 410 sieve. Before the coating is set, a coarse refractory material should be dusted onto the coated pattern.

An anti-corrosive paint may be prepared by dispersing zinc dust into the hydrolysate prepared under neutral or acidic conditions. A suitable zinc dust is New Jersey 444 material or Zincoli 620 zinc dust.

Thus two usefully gellable hydrolysates are firstly that which binds a refractory powder as envisaged above and secondly that which forms the basis of a zinc rich paint or other preservative substance. However any hydrolysate which gels after a reasonable and predictable interval, i.e. in a controlled manner, may be regarded as useful.

A suitable ethyl silicate is a commercial technical ethyl silicate having a silica content of 40% w/w or greater. A convenient procedure for preparing an acid hydrolysate of ethyl silicate suitable for use in the invention is described in British patent specification No. 1,356,249. Other suitable procedures for preparing acid hydrolysates of ethyl silicate, which may be used in the invention, are given in our copending application No. 46097/75. The hydrolysis procedures set out in British patent specification No. 1,356,248 may also be used.

In all of the following examples, the ethyl silicate used was a technical ethyl silicate (a mixture of ethyl orthosilicate and ethyl polysilicates) having a silica content of 40–42% by weight.

An important feature of the invention is the rapidity of synaresis, (i.e. gel-contraction) in gels obtained from bonding liquids prepared according to the invention. This promotes microcrazing and hence gives refractory shapes prepared according to the invention good resistance to thermal shock, i.e. the sudden reception of large amounts of heat. This is particularly useful for articles such as casting nozzles which are subject to these conditions.

EXAMPLE I

A suspension of Gasil 200 (10g) in aqueous ethanol (640P) (50ml) was prepared and warmed (60°–70° C.) gently for ~ 5 min. thereby implanting alkoxy groups onto GASIL particles. The suspension was cooled to ambient temperature and ethyl silicate (18ml) was added followed by a mixed organic base gellation catalyst (1.4ml). The solution was mixed thoroughly with a mullite/zirconia (Registered Trade Mark) refractory powder (450g) to form a slurry and poured into a mould with vibration. The hydrolysis took place using the water in the reaction system and at the same time the resultant hydrolysate was catalysed to gel. The slurry was allowed to set for ~ 30 min. The test bar so prepared had good green strength and surface finish. It developed a strong refractory bond after firing at 1600° C. Gasil 200 is a silica gel with a mean particle size of 5 $\mu$ a density of 0.50 g/ml a total $SiO_2$ content of 95% and a total $H_2O$ content of 5%.

EXAMPLE II

A suspension of Gasil 200 (10g) in aqueous ethanol (640P) (50ml) was prepared and warmed (60°-70° C.) gently for ~ 5 min. The suspension was cooled to ambient temperature and ethyl silicate (17.5ml) was added followed by a mixed organic base gellation catalyst (1.7ml). The solution was mixed thoroughly with the mullite/zirconia powder (450g) and the resultant slurry poured into a mould with vibration and allowed to set for ~ 20 min. The test bar so prepared had good green strength and surface finish. It developed a strong refractory bond after firing at 1600° C.

EXAMPLE III

A suspension of Gasil 200 (10g) in aqueous ethanol (640P) (50ml) was prepared and warmed (60°-70° C.) gently for ~ 5 min. The suspension was cooled to ambient temperature and ethyl silicate (17.5ml) added followed by mixed organic base catalyst (2ml). The solution was mixed thoroughly with the mullite/zirconia powder (450g), and the resultant slurry poured into a mould with vibration and allowed to set for ~ 15 min. The test bar so prepared had good green strength and surface finish. It developed a strong refractory bond after firing at 1600° C.

EXAMPLE IV

A suspension of Gasil 200 (15g) in aqueous ethanol (640P) (40ml) was prepared and warmed (60°-70° C.) gently for ~ 5 min. Then a further volume of aqueous ethanol (15ml) was added and the suspension cooled to ambient temperature and stirred with ethyl silicate (8.7ml). Finally a mixed organic base catalyst (2.5ml) was added immediately followed by the mullite/zirconia powder (450g). The resultant slurry was poured into a mould with vibration and allowed to set for ~ 15 min. The test bar so prepared had good green strength and surface finish. It developed a strong refractory bond after firing at 1600° C.

EXAMPLE V

A suspension of Gasil 200 (15g) in aqueous ethanol (640P) (40ml) was prepared and warmed (60°-70° C.) gently for ~ 5 min. Then a further volume of aqueous ethanol (15ml) was added and the suspension cooled to ambient temperature and stirred with ethyl silicate (12ml). A mixed organic base catalyst (2.5ml) was then added immediately followed by the mullite/zirconia powder (450g). The slurry was then poured into a mould with vibration and allowed to set for ~ 10 min. the test bar so prepared had good green strength and surface finish. It developed a strong refractory bond after firing at 1650° C.

EXAMPLE VI

A suspension of Gasil 200 (15g) in aqueous ethanol (640P) (40ml) was prepared and warmed (60°-70° C.) gently for ~ 5 min. Then a further volume of aqueous ethanol (15ml) was added and the suspension cooled to ambient temperature and stirred with ethyl silicate (9ml). Mixed organic base catalyst (4.5ml) was then added immediately followed by the mullite/zirconia powder (450g). The slurry mixture was then poured into a mould with vibration and allowed to set for ~ 3 min. The test bar so prepared had good green strength and surface finish. It developed a strong refractory bond after firing at 1600° C.

EXAMPLE VII

Preparation of a Nozzle for use in the Continuous Casting of Steel

A suspension of Gasil 200 (300g) in aqueous ethanol (64 OP) (800ml) was prepared and warmed (60°-70° C.) gently for ~ 10 min. A further volume of aqueous ethanol (300ml) was then added and the suspension cooled to ambient temperature and stirred with ethyl silicate (180ml). Finally a mixed organic base catalyst (90ml) was added immediately followed by the mullite/zirconia powder (20lb). The slurry was poured into a mould with vibration and allowed to set for ~ 18 min. The nozzle so prepared had excellent green strength and surface finish and was ready for safe handling after ~ 25 min. It developed a strong refractory bond after air drying at room temperature and firing at 1600° C.

EXAMPLE VIII

Preparation of a Nozzle for use in the Continuous Casting of Steel

A suspension of Gasil 200 (300g) in aqueous ethanol (64OP) (800ml) was prepared and warmed (60°-70° C.) gently for ~ 10 min. Then a further volume of ethanol (150ml) was added cooled to ambient temperature and stirred with ethyl silicate (240ml). Mixed organic base catalyst (95ml) was then added immediately followed by the mullite/zirconia powder (20lb). The mixture was poured into a mould with vibration and allowed to set for ~ 12 min. The nozzle so prepared had excellent green strength and surface finish and was ready for safe handling after ~ 30 min. It developed a strong refractory bond after air drying at room temperature for 4 days and firing at 1550°-1600° C.

EXAMPLE IX

Preparation of a Nozzle for use in the Continuous Casting of Steel

A suspension of Gasil 200 (255g) in aqueous ethanol (64 OP) (400ml) was prepared and warmed (60°-70° C.) gently for ~ 10 min. Then a further volume of ethanol (140ml) was added, the suspension cooled to ambient temperature and stirred with ethyl silicate (204ml). Finally a mixed organic base catalyst (77ml) was added immediately followed by the mullite/zirconia powder (17lb). The slurry was poured into a mould with vibration and allowed to set for ~ 9 min. The nozzle so prepared had excellent green strength and surface finish and was ready for safe handling after ~ 20 min. It developed a strong refractory bond after air drying at room temperature for 6 days and firing at 1550°-1600° C.

EXAMPLE X

Preparation of a Nozzle for use in the Continuous Casting of Steel

A suspension of Gasil 200 (255g) in aqueous ethanol (64 OP) (400ml) was prepared and warmed (60°–70° C.) gently for ~ 10 min. Then a further volume of ethanol (140ml) was added and the suspension cooled at ambient temperature and stirred with ethyl silicate (204ml). Mixed organic base catalyst (90ml) was then added immediately followed by the mullite/zirconia powder (17lb). The slurry was poured into a mould with vibration and allowed to set for ~ 6 min. The nozzle so prepared had excellent green strength and surface finish and was ready for safe handling after only 15 min. It developed a strong refractory bond after air drying for 6 days and firing at 1550°–1600° C. The mixed organic base catalyst used in the examples I–X and XV to XVIII is a mixture of:

| Piperidine | 1 part |
|---|---|
| + Dicyclohexylamine | 1 part |
| + Water | 1 part |

The mullite/zirconia refractory powder is preferably the second preferred mixture of powdered refractory materials given in British Pat. Specification No. 1,429,723.

Preparation of Acid Catalysed Ethylsilicate Hydrolysate (ATES)

Technical ethyl silicate (500g) was mixed with aqueous ethanol (64 OP) (487g) and water (13g) followed by concentrated hydrochloric acid (1.2 cm$^3$). The mixture was stirred thoroughly. A small exothermic reaction was observed. The solution was ready for use as soon as it attained ambient temperature.

All acid catalysed ethyl silicate (ATES) reactions were carried out using above mixture.

Silica content of technical ethyl silicate was 40–42% by weight.

EXAMPLE XI

A suspension of Gasil 200 (15g) in aqueous ethanol (64 OP) (23 cm$^3$) was prepared and gently warmed (60°–70° C.) until a nearly dry paste is obtained. Then acid catalysed ethyl silicate hydrolysate (35 cm$^3$) and aqueous ethanol (8 cm$^3$) were added with constant stirring. Ammonium acetate accelerator (5 cm$^3$) was added immediately followed by the zirconia/mullite powder (450g) mixed thoroughly and cast into a mould under vibration and allowed to set for ~ 2.5 min.

The test bar so prepared maintained high dimensional accuracy and excellent surface finish. It was ready for safe handling as soon as removed from the cast. Air dried the test bar for four days and fired at 1650° C. to mature the refractory bond. The aqueous ammonium acetate accelerator was the strong solution of ammonium acetate (British Pharmacopoea 1953 edition).

EXAMPLE XII

Preparation of a Nozzle for use in the Continuous Casting of Steel.

A suspension of Gasil 200 (430g) in aqueous ethanol (64 OP) (450 cm$^3$) was prepared and gently warmed (60°–70° C.) ~ 10 min. Then was added with constant stirring acid catalysed ethyl silicate hydrolysate (660 cm$^3$) and a further volume of aqueous ethanol (90 c$^3$). Aqueous ammonium acetate solution (100 cm$^3$) was then added immediately followed by the zirconia/mullite powder (17.5 lb). The slurry was mixed thoroughly and cast into a mould under vibration. The cast set in ~ 3.5 min. The nozzle so prepared had excellent green strength and surface finish. It developed a strong refractory bond after air drying (5 days), baking at 150° C. (2 days) and firing at 1550°–1600° C. The aqueous ammonium acetate was the strong solution of ammonium acetate, (British Pharmacopoea 1953 edition).

EXAMPLE XIII

Preparation of a Nozzle for use in the Continuous Casting of Steel

A suspension of Gasil 200 (420g) in aqueous ethanol (64 OP) (450 cm$^3$) was prepared and gently warmed (60°–70° C.) for ~ 10 min. Then was added with constant stirring acid catalysed ethyl silicate hydrolysate (640 cm$^3$) and a further volume of ethanol (80 cm$^3$). The aqueous ammonium acetate solution (90 cm$^3$) was added immediately followed by the mullite/zirconia powder (17.5 lb) and the resulting slurry mixed thoroughly. The slurry was poured into a mould with vibration and allowed to set for ~ 5 min. The nozzle so prepared had excellent green strength and surface finish. It developed a strong refractory bond after air drying (5 days), baking at 150° C. (2 days) and firing at 1550°–1600° C. The aqueous ammonium acetate was the strong solution of ammonium acetate (British Pharmacopoea 1953 edition).

Use of Gasil 200 and Technical Ethyl Silicate as Binder for Silicon Carbide Mixture

EXAMPLE XIV

A suspension of Gasil 200 (30g) in aqueous ethanol (64 OP) (50 cm$^3$) was prepared and gently warmed (60°–70° C.) for ~ 5 min. Then technical ethyl silicate (35 cm$^3$) was added and the suspension stirred thoroughly and allowed to cool to ambient temperature. Finally mixed base accelerator (6 cm$^3$) was added immediately followed by silicon carbide (coarse: fine ratio 5:2), (450g). The slurry was intimately mixed, cast into a mould under vibration and allowed to set for ~ 15 min. The test bar so prepared had good green strength and surface finish. It was air dried for 5 days and fired at 1650° C. to mature the ceramic bond.

EXAMPLE XV

Preparation of a Brick

A suspension of Gasil 200 (210g) in aqueous ethanol (64 OP) (250 cm$^3$) was prepared and gently warmed (60°–70° C.) for ~ 10 min. Then technical ethyl silicate (210 cm$^3$) was added, stirred thoroughly and cooled to ambient temperature. Mixed organic base (50 cm$^3$) was then added immediately followed by silicon carbide mix (coarse; fine ratio 5:2). The slurry was intimately mixed, cast into a mould under vibration and allowed to set for ~ 5 min. The brick so prepared had excellent green strength and surface finish. It was air dried for 5 days, baked at 150° C. (2 days) and finally fired at 1650° C. to mature the silica ceramic bond.

EXAMPLE XVI

Preparation of a Brick

Another silicon carbide brick was prepared following the procedure described in example XV. The various amounts of chemicals used are shown below:

| | | |
|---|---|---|
| Gasil 200 | 240 | g |
| aq. EtOH | 290 | cm³ |
| Tech. TES | 240 | cm³ |
| Mixed organic base | 75 | cm³ |
| Silicon carbide mix | 8 | lbs |

The refractory mix set in ~5 min. The brick so obtained had excellent green strength and surface finish. It developed a strong silica ceramic bond after air drying (5 days), baking at 150° C. (2 days) followed by final firing at 1650° C.

Incorporation of Reactive Alumina in Silicon Carbide Mixture

EXAMPLE XVII

A suspension of reactive alumina (super ground A15 supplied by Alcoa of Great Britian Limited) (15g) in aqueous ethanol (64 OP) (22 cm³) was prepared and gently warmed (70°-80° C.) for ~5 min. until nearly a dry paste is obtained. Then technical ethyl silicate (30 cm³) was added, stirred well and cooled to ambient temperature. Then mixed organic base (1.15 cm³) was added followed immediately by silicon carbide (450g). The slurry was mixed thoroughly and cast into a mould under vibration. The mixture set in ~5 min. The test bar so prepared had excellent green strength and surface finish. It was air dried (4 days) and fired at 1600° C. to develop a strong ceramic bond.

EXAMPLE XVIII

Preparation of a Brick

A suspension of reactive alumina (super ground A15 supplied by Alcoa of Great Britain Limited) (410g) in aqueous ethanol (64 OP) (170 cm³) was prepared and gently warmed (70°-80° C.) for ~10 min. Then technical ethyl silicate (300 cm³) was added and the suspension stirred and cooled to ambient temperature. Finally added mixed organic base (12 cm³) was added followed immediately by silicon carbide mix (coarse: fine ratio 5:2) (9lbs). The slurry was intimately mixed and cast into a mould under vibration. The mixture set in ~25 min. The brick had excellent green strength and surface finish. It developed a strong ceramic bond after air drying (4 days), baking (~150° C. for 2 days) and firing at 1600° C.

EXAMPLE XIX

270 Grams of Gasil WP2 were heated at 60°-70° C. with 270ml of ethyl alcohol 740P and 270 ml of technical ethyl silicate (40%-42% by weight SiO₂) were added, together with 50 ml of mixed base mixture. 9 lbs of zirconia/mullite powder were now added. The resulting slurry was cast into a mould under vibration. The setting time was 10 minutes. The article was air-dried for four days, then fired at 1600° C.

EXAMPLE XX

A suspension of Gasil WP2 (a micronised silica gell having a mean particle size of 11/μ a total silica content of 65% and total water content of 35% (225 grams) in 740P ethyl alcohol (198 ml) was heated for about 10 minutes at 60°-70° C. Then 270 ml of acid hydrolysate of ethyl silicate, prepared as previously described, was added and the mixture allowed to cool to ambient temperature. 49.5 ml of strong ammonium acetate solution (British Pharmacopoea 1953 edition) were now added, followed by 9lb of zirconia/mullite powder. The resulting slurry was cast into a mould under vibration. When the slurry had set, the article was removed from the mould, air-dried for four days, then fired at 1600° C. Gasil WP2 has a rather higher mean particle size than is normally desirable but also has a higher hydroxy content which provides sites for the implanting reaction.

To improve the flow properties of the slurry, 50 ml of 740P ethyl alcohol may be added. The setting time of the slurry is about 15 minutes.

In example XVIII a suspension of reactive alumina is mixed with technical ethyl silicate and an organic base (a mixture of piperidine, dicyclohexylamine and water). To the mixture is added silicon carbide powder to produce a castable slurry. In accordance with the next example a basic titanium compound such as an aminoalkyl titanate specifically triethanolamine titanate, is used as all or part of the organic base Triethanolamine titanate is in its base its own right and is prepared from the reaction between triethanolamine and a titanium alkoxide Ti (OR)₄. R is n butyl or iso-propyl. At least two of the alkoxide groups are replaced by reaction with triethanolamine, two ROH groups being removed. The reaction product, triethanolamine titanate, is of indefinite composition, but the reaction is reproducible if the same quantity of ROH is removed.

A triethanolamine titanate prepared from the reaction between triethanolamine and titanium tetra iso-propoxide is commercially available.

The use of a basic titanium compound produces in the finished sintered refractory body a remarkable and wholly unexpected improvement in abrasion resistance. In fact the present invention provides, for the first time, the possibility of producing a tough abrasion resistant silicon carbide body.

EXAMPLE XXI

Preparation of Silicon Carbide Brick Using Reactive Al₂O₃—Technical Ethyl Silicate (40% SiO₂ Content) System in the Presence of TiO₂ as a Mineraliser

Amounts of Reagents Used (1) Wt of Reactive Alumina=410g
(2) Vol of EtOH (64OP)=150ml
(3) Vol of Technical Ethyl Silicate=300ml
(4) Vol of Triethanolamine Titanate=75ml
(5) Vol of Organic Base=20ml
(6) Wt of Silicon Carbide Mix (5:2 Coarse: fine)=9lb

Procedure

A suspension of reactive alumina (Alcoa A 15) (410g) was prepared in aqueous ethanol (64 OP) (150ml) and gently warmed for 10 minutes. Ester groups are thereby implanted onto the alumina. 300ml of technical ethyl silicate and 75ml of triethanolamine titanate were added, stirred well and allowed to cool to ambient temperature. The base accelerator (20 ml) was then added immediately followed by silicon carbide mix (9 lbs) and the complete formulation was mixed thoroughly using a mechanical stirrer and cast into a mould under vibration. The setting time was approximately 15 minutes and the brick maintained a high dimensional accuracy and had good 'green' strength. The brick was then air dried for approximately 24 hours, baked for 24 hours and finally fired up to 1600° C.

The brick has the following properties:

| Apparent porosity | | 21.6 | % |
|---|---|---|---|
| Bulk density | | 2.45 | |
| Abrasion index | | | |
| Morgan Marshall Test | Skin | 54 | |
| | Cut face | 96 | |

For comparison, a silicon carbide brick bonded with 'amine modified' ethyl silicate had an abrasion index of about 1100 which is quite unsatisfactory. A clay bonded silicon carbide brick will have an abrasion index of about 110. These figures are Morgan Marshall Test figures for skin i.e. uncut.

In the previous examples the implanting of the alkoxy groups on to hydrous metal oxide is induced by warming the oxide with alcohol. The following examples illustrate the induction of this implanting by physical means. in these examples a high speed stirrer is used but a perl or sand mill has also been found useful. In such mills the substance being milled is subject to intense shearing and agitation by passing the substance through a chamber containing discrete particles. The mixture of the substance and the particles is agitated by elements rotating in the chamber. When these physical agitating means are used there is a reduction in the mean particle size in the hydrous metal oxide and this is advantageous. The following examples also illustrate how the alkoxy group implanting and the joint hydrolysis can be carried out in a single reaction system provided that a mutual solvent is present:

EXAMPLE XXII

Stage 1—Preparation of Binding Liquid

The following ingredients are mixed in the order given:

74 OP industrial methylated spirit or isopropanol—375ml
Polyethylene glycol (PEG 600) (optional mutual solvent—to improve suspension)—10ml
Water, preferably deionised—40ml
Gasil 200—225 grams Mix for ten minutes using high speed stirrer (3000 r.p.m.) Now add ethyl silicate (40% SiO$_2$)—200 ml
Mix for a further ten minutes using high speed stirrer—3000 r.p.m.
This gives the binding liquid Stage 2—Preparation of Accelerator for Gelatin The gelation accelerator is a solution of piperidine in water.
Two volume piperidine plus one volume water.
Add 80 ml of this gelation accelerator to the binding liquid prepared in Stage 1.

Stage 3—Preparation of Slurry

Add 17 lb of mullite/zirconia refractory powder to the liquid obtained from Stage 1+Stage 2. This setting time is 10-12 minutes.

NOTE: Stage 1 can be carried out as a single operation if desired, by adding the ethyl silicate before the Gasil 200. If this is done, the PEG 600 mutual solvent is essential, to obtain a smooth suspension. 50% of the silica derived from ethyl silicate is replaced by Gasil 200, if the slurry is too dry, add more alcohol.

EXAMPLE XXIII

Stage 1—Preparation of Binding Liquid

The following ingredients are mixed in the order given:-

74 OP industrial methylated spirit or isopropanol—300ml
Polyethylene glycol (PEG 600) (optional—to improve suspension)—12ml
Water, preferably deionised—33ml
Gasil 200—160 grams Mix for ten minutes using high speed stirrer (3000 r.p.m.)
Now add ethyl silicate (40% SiO$_2$)—350 ml
Mix for a further ten minutes using high speed stirrer (3000 r.p.m.) This gives the binding liquid.

Stage 2—Preparation of Accelerator for Gelation

The gelation accelerator is a solution of piperidine in water.
Two volumes of piperidine plus one volume of water
Add 94 ml of this gelation accelerator to the binding liquid prepared in Stage 1.

Stage 3—Preparation of Slurry

Add 20 lb of zirconialmullite refractory powder to the liquid obtained from Stage 1+Stage 2. Setting time 10-12 minutes.

NOTE: Stage 1 can be carried out as a single operation by adding the ethyl silicate before the Gasil 200. If this is done, the PEG 600 is essential to obtain a smooth suspension. 50% of the silica in the cohydrolysate is derived from the GASIL 200. More alcohol can be added if the slurry is too dry.

EXAMPLE XXIV

Stage 1—Preparation of Binding Liquid

The following ingredients are mixed in the order given:

740P industrial methylated spirit or isopropanol—360 ml
Polyethylene glycol (PEG 600)—12 ml
Water, preferably deionised—40 ml
Gasil 200—200 grams Mix for ten minutes, using high speed stirrer (3000 r.p.m.)
Now add ethyl silicate (40% SiO$_2$)—280 ml
Mix for a further ten minutes, using high speed stirrer (3000 r.p.m.). This gives the binding liquid.

Stage 2—Preparation of Accelerator for Gelation

The gelation accelerator is a solution of piperidine in water.
Two volumes of piperidine plus one volume of water.
Add 94 ml of this gelation accelerator to the binding liquid prepared in Stage 1.

Stage 3—Preparation of Slurry

Add 20 lb of zirconia/mullite refractory powder to the liquid obtained from Stage 1+Stage 2. Setting time 10-12 minutes.

NOTE: Stage 1 can be carried out as a single operation by adding the ethyl silicate before the Gasil 200. If this is done, the PEG 600 is essential, to obtain a smooth dispersion. 60% of the silica in the cohydrolysate is derived from the Gasil 200. More alcohol can be added if the slurry is too dry.

In Examples XXII to XXIV the ethanol (or isopropanol) has been taken as containing 1% water.

EXAMPLE XXV

The hydrolysates of the present invention can be used in the procedure described in British patent specification No. 761,394 and 774,184, also in Eire Pat. No. 27,266 are used for making moulds, part moulds or cores for use in casting metals or alloys. In broad aspect the process set out in these specifications comprising pouring a slurry of a refractory powder and an acid hydrolysate over a pattern, allowing the slurry to set, removing the pattern igniting surplus alcohol to promote microcrazing and then firing the shaped object. A suitable powdered refractory composition comprises:

Molochite 200 grade—70 parts by weight
Molochite 30-80 grade—20 parts by weight
Molochite 16-30 grade—10 parts by weight Molochite is a registered trade mark, Molochite is an aluminosilicate containing 42–43% $Al_2O_3$ prepared by calcination of a china clay. The preparation is described in Claycraft, 1972, 45, (i), 10.

3–5 kg of the above powdered refractory composition is used with 1 liter of the hydrolysates prepared as described in Examples XI, XII, XIII, XX and XXIV.

We claim:

1. A method of producing a gellable hydrolysate, such method including the etherification step of implanting alkoxy groups onto the surface of a first substance comprising a finely divided hydrous inorganic oxide that is not inherently capable of being hydrolysed, said first substance having at least one group selected from hydroxyl, oxide or oxo bridge groups available to participate in said implant, and jointly hydrolysing the said first substance with a second inherently hydrolysable substance.

2. A method as claimed in claim 1 wherein the reaction to implant the alkoxy groups is induced by heat.

3. A method as claimed in claim 1 wherein the reaction to implant the alkoxy groups is induced by physical work.

4. A method as claimed in claim 1 wherein the said second substance is an organic silicate.

5. A method as claimed in claim 4 wherein the oxide is silica.

6. A method as claimed in claim 4 wherein the oxide is alumina.

7. A method as claimed in claim 4 wherein the oxide is zirconia.

8. A method as claimed in claim 4 wherein the hydrous oxide is a gel.

9. A method as claimed in claim 1 wherein the etherification is carried out by reaction of the hydrous oxide with a water soluble or water miscible alcohol.

10. A method as claimed in claim 9 wherein the reaction system also contains an organic solvent.

11. A method as claimed in claim 4 wherein up to 75% of the $SiO_2$ in the hydrolysate is provided by a silica gel constituting the hydrous metal oxide.

12. A method as claimed in claim 11 wherein 50% of the $SiO_2$ in the hydrolysate is provided by the silica gel.

13. A method as claimed in claim 4 wherein the mean particle size in the finely divided oxide is less than 1 $\mu$.

14. A method as claimed in claim 13 wherein the mean particle size is less than 0.7 $\mu$.

15. A method as claimed in claim 13 wherein the starting material for the finely divided metal oxide initially has a mean particle size larger than 1 micron, the mean particle size being reduced to less than 1 micron.

16. A method as claimed in claim 15 wherein the mean particle size is reduced by chemical attack with a strong mineral acid.

17. A method as claimed in claim 15 wherein the reduction in mean particle size is caused by the shearing action of mechanical agitators.

18. A method as claimed in claim 15 wherein the reduction in mean particle size is caused by wetting in the presence of an organic solvent and a surfactant under the influence of heat.

19. A method as claimed in claim 15 wherein the reduction in mean particle size is carried out by a combination of mechanical agitation and the action of a surface active agent.

20. A method as claimed in claim 1 wherein the reaction to implant the alkoxy groups is induced by heat.

21. A method as claimed in claim 1 wherein the reaction to implant the alkoxy groups is induced by physical work.

22. A method as claimed in claim 1 wherein the alkoxy implanting and the joint hydrolysis are performed as separate sequential steps.

23. A method as claimed in claim 4 wherein the alkoxy implanting and the joint hydrolysis are performed in the same reaction system in the presence of a surfactant.

* * * * *